(12) United States Patent
Mochida

(10) Patent No.: US 9,973,069 B2
(45) Date of Patent: May 15, 2018

(54) ROTOR FOR SYNCHRONOUS RELUCTANCE MOTOR WITH REDUCED FLUX LEAKAGE AND RESIDUAL STRESS

(71) Applicant: FUJI ELECTRIC CO., LTD., Kawasaki-shi, Kanagawa (JP)

(72) Inventor: Toshiharu Mochida, Suzuka (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days. days.

(21) Appl. No.: 15/231,818

(22) Filed: Aug. 9, 2016

(65) Prior Publication Data

US 2016/0352202 A1    Dec. 1, 2016

Related U.S. Application Data

(63) Continuation of application No. PCT/JP2014/071155, filed on Aug. 11, 2014.

(51) Int. Cl.
*H02K 1/24*    (2006.01)
*H02K 19/10*   (2006.01)
(Continued)

(52) U.S. Cl.
CPC ............. *H02K 19/103* (2013.01); *H02K 1/24* (2013.01); *H02K 1/246* (2013.01); *H02K 1/2706* (2013.01); *H02K 19/10* (2013.01); *H02K 1/146* (2013.01)

(58) Field of Classification Search
CPC .... H02K 1/2766; H02K 19/103; H02K 1/246; H02K 1/146; H02K 25/00; H02K 19/10; H02K 1/276; H02K 21/00; H02K 21/028; H02K 1/24; H02K 1/2706

USPC ...... 310/156.83, 216.075, 216.107, 216.055, 310/216.069, 216.073, 216.096, 46, 310/216.106, 216.071
See application file for complete search history.

(56) References Cited

U.S. PATENT DOCUMENTS 6,121,706 A      9/2000  Nashiki et al.
7,459,821 B2 *  12/2008  Ho Cheong .......... H01F 13/003
                                                  310/156.53
(Continued)

FOREIGN PATENT DOCUMENTS

CN    101507084 A    8/2009
CN    102957239 A    3/2013
(Continued)

*Primary Examiner* — Bernard Rojas
*Assistant Examiner* — Alexander Singh
(74) *Attorney, Agent, or Firm* — Rabin & Berdo, P.C.

(57) ABSTRACT

Provided is a synchronous reluctance rotating electrical machine that has superior rotor strength, and that can be manufactured at low cost. Asynchronous reluctance motor has a rotor wherein a multiple of quadrature axes are formed in a circumferential direction. The rotor has two neighboring quadrature axis holes sandwiching a center bridge in the circumferential direction of the rotor in order to form one quadrature axis. The quadrature axis holes communicate with an outer periphery of the rotor on a side opposite to that of the center bridge. The center bridge is located on the outer side, in a radial direction of the rotor, of an inscribed circle of the multiple of quadrature axis holes. Also, the rotor 3 has a direct axis projection protruding in the direction of a direct axis between two neighboring quadrature axes.

7 Claims, 5 Drawing Sheets

(51) Int. Cl.
*H02K 1/27* (2006.01)
*H02K 1/14* (2006.01)

(56) References Cited

U.S. PATENT DOCUMENTS

| | | | |
|---|---|---|---|
| 8,044,548 B2 | 10/2011 | Sakai et al. | |
| 2009/0224624 A1* | 9/2009 | Kumar | H02K 1/276 310/156.53 |
| 2011/0062815 A1* | 3/2011 | Aota | H02K 1/276 310/156.53 |
| 2013/0043757 A1* | 2/2013 | Kagami | H02K 1/2766 310/156.53 |

FOREIGN PATENT DOCUMENTS

| | | |
|---|---|---|
| JP | H11-168864 A | 6/1999 |
| JP | 2000-050542 A | 2/2000 |
| JP | 2002-010594 A | 1/2002 |

\* cited by examiner

ROTOR FOR SYNCHRONOUS RELUCTANCE MOTOR WITH REDUCED FLUX LEAKAGE AND RESIDUAL STRESS

This application is a continuation under 35 U.S.C. 120 of International Application PCT/JP2014/071155 having the International Filing Date of Aug. 11, 2014, which is fully incorporated herein by reference.

TECHNICAL FIELD

The present invention relates to a synchronous reluctance rotating electrical machine, such as a synchronous reluctance motor, that utilizes reluctance torque.

BACKGROUND ART

Torque T of a synchronous reluctance motor can be expressed by the following equation.

$$T = Pn \cdot (Ld - Lq) \cdot id \cdot iq \quad (1)$$

In equation (1), Ld is direct axis inductance, Lq is quadrature axis inductance, id is direct axis current, iq is quadrature axis current, and Pn is the number of pole pairs. Herein, the direct axis inductance Ld is practically determined by the number of armature windings, the gap length, and the magnetic characteristics of the iron core material. As the direct axis inductance Ld is the greatest inductance in a synchronous reluctance motor, the structure of a rotor is determined in such a way that the quadrature axis inductance Lq is as small as possible. In order to reduce the quadrature axis inductance in a state in which the number of windings is constant, it is necessary to reduce the relative permeability, that is, increase the magnetic resistance, at the quadrature axis. Therefore, an existing synchronous reluctance motor is such that the quadrature axis inductance Lq is reduced by increasing the ratio of air per loop of a magnetic flux path along the quadrature axis.

FIG. 5 is a sectional view showing a configuration example of a rotor of an existing synchronous reluctance motor. In the example shown, there are two air layer slits in order to increase the direct axis inductance Ld and reduce the quadrature axis inductance Lq. In FIG. 5, 101 is a rotor iron core, 102 is a first layer slit (outer periphery side), 103 is a second layer slit, 104 is a side bridge (first layer), and 105 is a side bridge (second layer). Herein, it is common that the thicknesses of the side bridges 104 and 105 of the slits 102 and 103 are both the same. Also, the side bridge thickness is preferably as small as possible, as the quadrature axis inductance can be reduced, but as the mechanical resistance with respect to centrifugal force becomes weak, the dimension is determined in accordance with rotation speed.

An advantage of the synchronous reluctance motor is that there is no magnet or the like in the rotor, so the rotor can withstand high speed rotation. However, the synchronous reluctance motor is such that stress concentrates in the side bridge 104 of the slit 102 and the side bridge 105 of the slit 103 shown in FIG. 5 due to centrifugal force working on the rotor. Therefore, the synchronous reluctance motor is such that the dimension of the side bridges needs to be determined so that the stress in the side bridges is restricted to or below the strength of the material thereof.

CITATION LIST

Patent Literature

PTL 1: JP-A-2002-10594

SUMMARY

Generally, a motor is such that, when rotor steel is fitted and fixed into a shaft, circumferential direction assembly residual stress remains in the rotor steel. A range in which the assembly residual stress mainly remains is a radial range in which no hole or cutout exists in a circumference centered on the rotor shaft (that is, a range connected in a ring form). In the case of the existing example, there is a ring-form region on the outermost periphery of the rotor owing to the existence of the side bridges 104 and 105, and tensile residual stress remains in the ring-form region on the outermost periphery. Also, shear stress caused by centrifugal force is applied to the side bridges 104 and 105 when the rotor rotates. Consequently, in addition to the tensile residual stress when assembling, shear stress caused by centrifugal force is superimposed on the side bridges 104 and 105 when the rotor rotates. In the existing example, the widths of the side bridges 104 and 105 need to be increased in order to prevent damage to the side bridges. Therefore, there is a limit to the reduction of the quadrature axis inductance Lq in the existing example.

Also, generally, when unevenness is provided in the outer peripheral surface of the rotor, a higher harmonic component of torque generated in the rotor can be converted to a fundamental wave component, whereby torque ripple can be reduced and torque increased. However, in the case of a rotor that has a ring-form outermost periphery region with no hole or dimple on the outer side of a quadrature axis hole, as in the existing example, assembly residual stress remains in the ring-form region on the outermost periphery. Consequently, it is difficult with existing rotors to provide unevenness that leads to a concentration of stress in the outermost peripheral surface of a rotor in which this kind of residual stress remains. Therefore, existing synchronous reluctance motors are such that it is difficult to increase torque by providing unevenness in the outer peripheral surface of the rotor.

The invention, having been contrived considering the heretofore described kind of situation, has a first object of providing a synchronous reluctance rotating electrical machine that has superior rotor strength, and that can be manufactured at low cost. Also, a second object of the invention is to increase torque generated by the rotor, without reducing the strength of the rotor.

The invention provides a synchronous reluctance rotating electrical machine including a rotor provided with a center bridge that is formed between quadrature axis holes formed in a circumferential direction, one pole being configured with an even number of the quadrature axis holes and the center bridge, wherein the quadrature axis holes communicate with an outer periphery of the rotor on a side opposite to that of the center bridge, and the center bridge is located on an outer side, in a radial direction of the rotor, of an inscribed circle of the quadrature axis holes.

Advantageous Effects of Invention

According to the invention, a quadrature axis hole is caused to communicate with the outer periphery of a rotor, because of which no region in which assembly residual stress remains occurs in the outermost periphery of the rotor. Therefore, the strength of the rotor when rotating can be increased. Also, as the configuration is such that the quadrature axis hole is caused to communicate with the outer periphery of the rotor, and no side bridge is necessary from the outset, there is no need either to configure the rotor by combining a steel plate in which there is no side bridge and a steel plate in which there is a side bridge in order to reduce leakage flux. Consequently, the rotor can be manufactured by stacking one kind of steel plate only. Also, as a center bridge is located on the outer side, in a radial direction of the rotor, of an inscribed circle of a multiple of quadrature axis holes, the strength of the center bridge when the rotor rotates can be increased. To describe in further detail, when carrying out an interference fit of a shaft into the rotor during the manufacture of a rotating electrical machine, tensile stress remains in a circumferential direction in rotor steel material. This residual stress barely occurs on the outer side of the inscribed circle of the quadrature axis holes. Meanwhile, tensile stress caused by centrifugal force is generated in the center bridge when the rotor rotates. According to the invention, the center bridge in which tensile stress caused by centrifugal force concentrates when the rotor rotates is located distanced from the inside of the inscribed circle, where residual stress caused by the interference fit process mainly occurs, because of which the strength of the center bridge when the rotor rotates can be increased.

DETAILED DESCRIPTION

Figure 1:
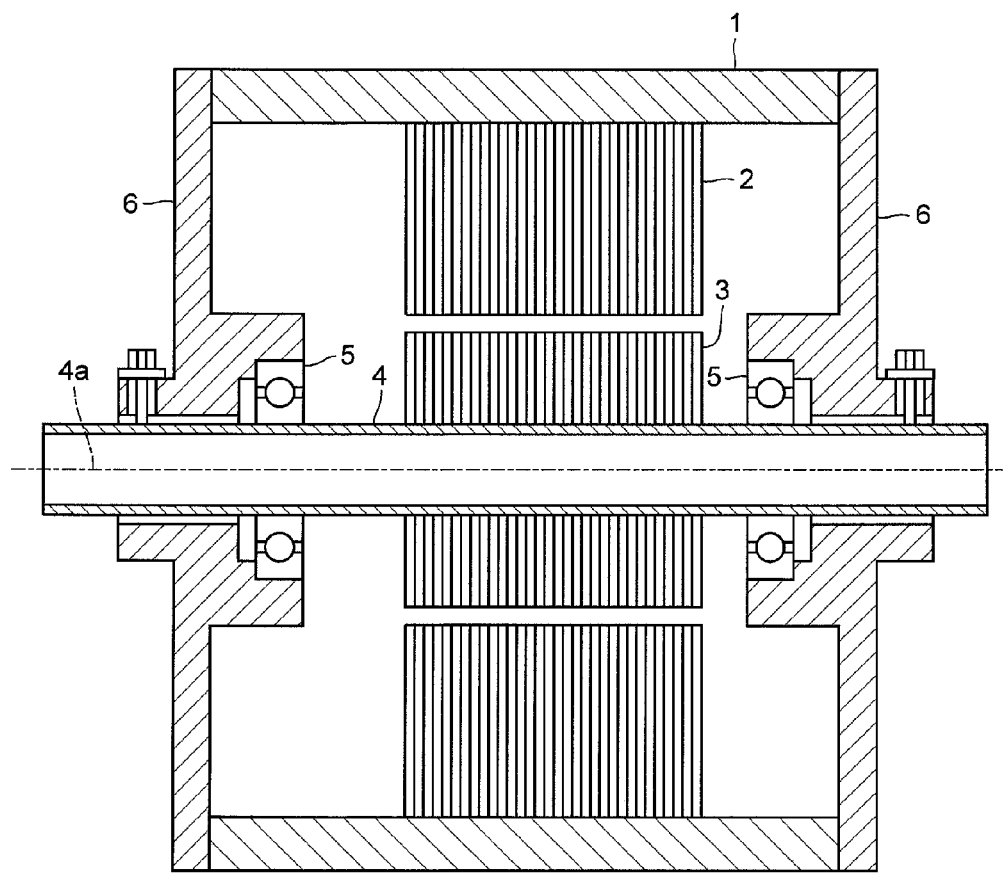
FIG. 1 is a vertical sectional view showing a configuration of a synchronous reluctance motor, which is an embodiment of a synchronous reluctance rotating electrical machine according to the invention.

Hereafter, referring to the drawings, embodiments of the invention will be described.

FIG. 1 is a vertical sectional view showing an overall configuration of a synchronous reluctance motor, which is an embodiment of a synchronous reluctance rotating electrical machine according to the invention. In FIG. 1, a frame 1 is a housing that covers the whole of a synchronous reluctance motor, and is configured of iron, aluminum, stainless steel, or the like. A fixed side iron core 2 of a hollow cylindrical form is provided on the inner side of the frame 1. The fixed side iron core 2 is formed by stacking silicon steel plates. A hole is provided in the fixed side iron core 2, and a stator winding formed of copper wire or the like is inserted through the hole (omitted from the drawing). A rotor 3, which is a rotating side iron core, is inserted on the inner side of the fixed side iron core 2 in a state such that there is a predetermined gap between the rotor 3 and the fixed side iron core 2. The rotor 3 is formed by stacking silicon steel plates. There is also a case wherein the rotor 3 is configured by cutting a simple iron block. A shaft 4 whose center is formed of iron or the like penetrates the rotor 3. Ideally, a central axis of the shaft 4 forms a central axis of rotation 4a of the rotor 3. Further, the shaft 4 is supported by a shield 6, provided at both the front and back ends of the frame 1, via a rolling bearing 5 formed of bearing steel or the like.

In this example, the rotor 3 is provided with energy by a rotating magnetic field created by the stator winding (not shown), and rotates around the central axis of rotation 4a.

Figure 2:
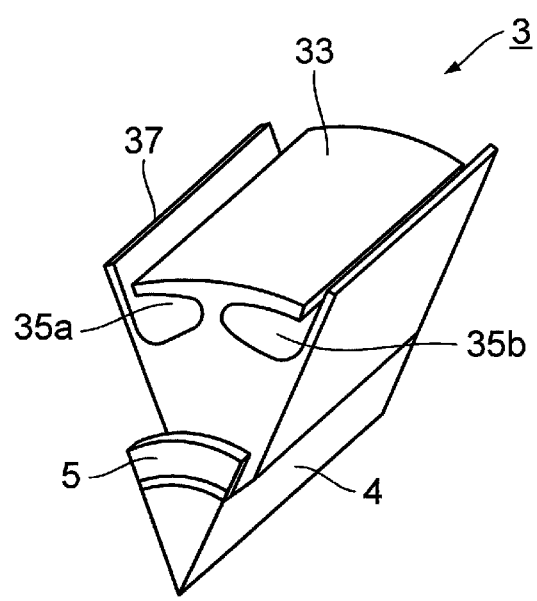
FIG. 2 is a perspective view showing a configuration of one pole of a rotor in the same embodiment.
Figure 3:
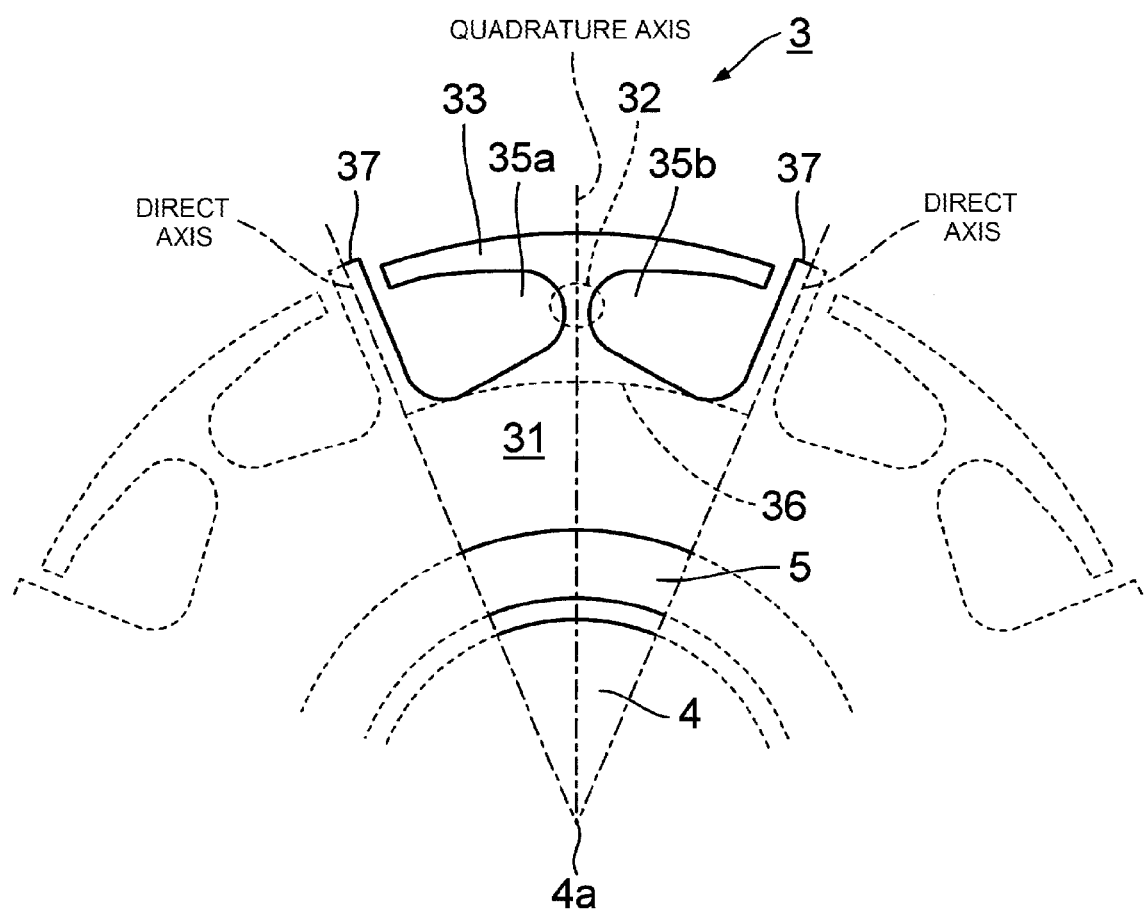
FIG. 3 is a front view showing a configuration of the one pole of the rotor in the same embodiment.

A characteristic of this embodiment is in the configuration of the rotor 3. FIG. 2 is a perspective view showing a configuration of one pole of the rotor 3 in this embodiment. Also, FIG. 3 is a front view of the one pole of the rotor 3 seen from the direction of the central axis of rotation 4a. In addition to the configuration of the one pole, configurations of poles on either side of the one pole in the direction of rotation are shown by broken lines in FIG. 3, in order to facilitate understanding of the configuration of the rotor 3.

The rotor 3 according to this embodiment can be broadly divided into a core portion 31 to the central axis of rotation 4a side, two quadrature axis holes 35a and 35b provided in the vicinity of the quadrature axis, a quadrature axis outer peripheral edge portion 33 formed of a rotor steel material on the outer side of the quadrature axis holes 35a and 35b as seen from the central axis of rotation 4a, a center bridge 32 of each pole, formed between the quadrature axis holes 35a and 35b and connecting the core portion 31 and the quadrature axis outer peripheral edge portion 33, and a direct axis projection 37 provided in a direct axis direction. Herein, the magnetic resistance of the quadrature axis is high in comparison with that of the direct axis, and magnetic flux flows less freely, meaning that, for example, the circumferential direction width of the center bridge 32 can be formed to be smaller than the circumferential direction width of the direct axis projection 37.

The quadrature axis outer peripheral edge portion 33 of the one pole has an approximately arc-form cross-section, and is connected to the core portion 31 via the center bridge 32 in the rotational direction center of the rotor. The outer peripheral surface of the quadrature axis outer peripheral edge portion 33 has a radius of curvature greater than the distance from the central axis of rotation 4a to the outermost peripheral portion of the rotor. The radius of curvature of one portion of the quadrature axis outer peripheral edge portion 33, rather than that of the whole of the quadrature axis outer peripheral edge portion 33 as heretofore described, may be greater than the distance from the central axis of rotation 4a to the outermost peripheral portion of the rotor.

The quadrature axis holes 35a and 35b are provided on the inner side of the quadrature axis outer peripheral edge portion 33. The quadrature axis holes 35a and 35b are enclosed in three directions by the quadrature axis outer peripheral edge portion 33, the center bridge 32, and the core portion 31. The quadrature axis outer peripheral edge portion 33 has a role of increasing direct axis inductance Ld. The quadrature axis outer peripheral edge portions 33 corresponding to each pole are aligned in the rotor rotation direction, with a gap between neighboring quadrature axis outer peripheral edge portions 33. The gap between two quadrature axis outer peripheral edge portions 33 is located in the vicinity of the direct axis. The quadrature axis holes 35a and 35b communicate with the rotor outer periphery on the side opposite to that of the center bridge 32, that is, via the gap in the vicinity of the direct axis.

The quadrature axis holes 35a and 35b are arrayed in a reverse V-shape, with the quadrature axis as the axis of symmetry. Further, a region (the core portion 31) on the central axis of rotation 4a side of the inner peripheral walls of the quadrature axis holes 35a and 35b inclines further in a direction away from the central axis of rotation 4a as the region moves away from the direct axis toward the vicinity of the quadrature axis (that is, the vicinity of the center bridge 32). Therefore, the center bridge 32 is in a position on the outer side, in the rotor radial direction, of an inscribed circle 36 of the quadrature axis holes 35a and 35b. In this way, the one pole is configured with the two quadrature axis holes 35*a* and 35*b* and the center bridge 32.

Also, the direct axis projection 37 is on the sides of the two quadrature axis holes 35*a* and 35*b* opposite to that of the center bridge 32 in the rotor rotation direction, that is, on the direct axis. Although only one pole is shown in FIG. 2 and FIG. 3, the direct axis projection 37 is located between two neighboring center bridges over the whole periphery.

The above is the configuration of the rotor 3 in this embodiment.

The rotor 3 in this embodiment is of a configuration wherein the quadrature axis holes 35*a* and 35*b* communicate with the outer periphery of the rotor. Hereafter, a reason for employing this configuration will be explained.

When manufacturing a motor, a method whereby a shaft and a rotor steel material are assembled using an interference fit such as a shrink fit is common. In this interference fit process, tensile stress remains in the circumferential direction in the rotor steel material. This residual stress also remains during high speed rotation of the rotor. It has been confirmed by calculations by the inventors of the present application using a finite element method that this residual stress barely occurs in a circumference having the same radius as a portion wherein there is a hole, dimple, or the like in the rotor steel material (that is, stress remains only in a portion connected in ring form in which there is no hole or dimple).

Meanwhile, a powerful centrifugal force is generated in each portion of the rotor when the rotor rotates, especially when rotating at high speed. At this time, when the rotor has a side bridge as in an existing example, large stress is generated in the side bridge. In this case, shear stress is generated in the side bridge due to the centrifugal force generated by the rotation of the rotor. Therefore, circumferential direction tensile stress generated when assembling and also remaining during high speed rotation, and radial direction shear stress originating from centrifugal force accompanying high speed rotation, are superimposed at a time of high speed rotation. In order to prevent damage to the rotor due to high speed rotation, there is a need to sufficiently increase the strength of the side bridge, and when the side bridge is thickened in order to increase the strength, the quadrature axis inductance Lq cannot be sufficiently reduced, which causes difficulty in rotor strength design.

Therefore, a configuration wherein the quadrature axis holes 35*a* and 35*b* communicate with the outer periphery of the rotor, that is, a configuration without the side bridge of the existing example, is employed as the configuration of the rotor in this embodiment. According to this embodiment, there is no side bridge in the outermost periphery of the rotor, because of which no assembly residual stress remains in the outermost periphery of the rotor. Stress generated due to centrifugal force when the rotor rotates concentrates in the center bridge, but as the stress working on the center bridge is tensile stress, measures whereby the center bridge is not damaged can easily be taken by adjusting the width of the center bridge, or the like. Moreover, the rotor configuration wherein the quadrature axis holes 35*a* and 35*b* communicate with the outer periphery of the rotor provides the large advantages described hereafter.

Firstly, the rotor 3 in this embodiment has an advantage in terms of fabrication. That is, when shaping the quadrature axis holes according to this embodiment from a single metal mass, the quadrature axis holes can be shaped simply by carrying out a removal process from the outer periphery side using wire cutting or the like. As there is no need to carry out processing from the axial direction when shaping a slit, as is the case in the existing example, all shaping can be carried out by processing from the radial direction.

Also, the rotor 3 in this embodiment is such that there are less magnetic flux leakage paths than in the existing example, which has a side bridge. Although the center bridge of this embodiment is also a magnetic flux leakage path, the number of centre bridges is clearly less than the number of side bridges in the existing example. Also, the center bridge can be narrowed. That is, stress when assembling does not remain in the center bridge according to this embodiment, centrifugal force is also in a simple uniaxial tensile state, and a steel material is strong with respect to this kind of stress condition. Therefore, the center bridge according to this embodiment can be narrower than the side bridge in the existing example, because of which the amount of leakage flux per bridge can be reduced. Therefore, the quadrature axis inductance Lq can be reduced further than in the existing example, which contributes to an increase in torque.

Furthermore, the rotor 3 according to this embodiment also has an advantage in terms of cooling. That is, the rotor 3 has good ventilation in the rotation axis direction, which is advantageous for rotor cooling. Consequently, regulations relating to motor capacity can be relaxed by employing the rotor 3 according to this embodiment.

As another characteristic of this embodiment, there is the direct axis projection 37. The direct axis projection 37 can generate strong reluctance torque, which contributes to an increase in torque generated in the rotor.

Furthermore, as another characteristic of this embodiment, there is the form of the quadrature axis outer peripheral edge portion 33. When unevenness is provided in the outer peripheral surface of the rotor, a higher harmonic component of torque generated in the rotor can be converted to a fundamental wave component, whereby torque ripple can be reduced and torque increased. Meanwhile, it is widely known that when force is applied to the uneven portion, locally high stress is generated due to a phenomenon called stress concentration. When there is a rotor in which no slit communicates with the outer periphery of the rotor and the outermost periphery is connected in a ring form, as in the existing example, assembly residual stress remains in the ring-form region in the vicinity of the outer peripheral surface of the rotor. Therefore, the rotor in the existing example is such that it is difficult to provide unevenness that leads to stress concentration in the outermost peripheral surface of the rotor in which this kind of residual stress remains. In this embodiment, however, the quadrature axis holes 35*a* and 35*b* are caused to communicate with the outer periphery of the rotor, because of which no residual stress remains in the quadrature axis outer peripheral edge portion 33, which is the outermost peripheral region of the rotor 3. Consequently, in this embodiment, it is easy to provide unevenness in the outer peripheral surface of the quadrature axis outer peripheral edge portion 33, which is the outermost peripheral region of the rotor 3, in order to increase torque. Therefore, in this embodiment, the radius of curvature of the outer peripheral surface of the quadrature axis outer peripheral edge portion 33, which is on the outer side of the horizontal holes as seen from the rotational center of the rotor, is greater than the distance from the rotational center of the rotor to the outermost peripheral portion of the rotor. It is not necessary that the outer peripheral surface of the quadrature axis outer peripheral edge portion 33 is a curved surface, as torque can be increased provided that the distance from the rotational center of the rotor of the outer peripheral surface of the quadrature axis outer peripheral edge portion 33 located on an extension of a straight line that passes through the center bridge 32 as seen from the rotational center of the rotor is shorter than that of the outer peripheral surface in another position. In this way, in this embodiment, torque ripple generated in the rotor 3 can be reduced and torque increased, without increasing the generation of stress.

Also, as the greatest characteristic of this embodiment, there is the positional relationship between the quadrature axis hole inscribed circle 36 and the center bridge 32. A description of advantages obtained from this characteristic is as follows.

Firstly, in the process of interference fitting the shaft 4 into the rotor 3, tensile stress remains in the circumferential direction in the rotor steel material. This residual stress barely occurs in a circumference having a radius the same as that of the quadrature axis holes 35a and 35b. Consequently, the rotor 3 in this embodiment is such that hardly any assembly residual stress remains further outward in the rotor radial direction than the inscribed circle 36 of the quadrature axis holes 35a and 35b. Meanwhile, tensile stress caused by centrifugal force is generated in the center bridge 32 when the rotor 3 rotates. When the quadrature axis hole inner peripheral wall in the vicinity of the quadrature axis is disposed in the same way further outward in the radial direction than the quadrature axis hole inner peripheral wall in the vicinity of the direct axis, the position of the center bridge 32 is further outward in the rotor radial direction than the inside of the inscribed circle 36, where residual stress mainly occurs. In this way, according to this embodiment, the center bridge 32 in which tensile stress caused by centrifugal force concentrates when the rotor 3 rotates is disposed distanced from the inside of the inscribed circle 36, where residual stress caused by the interference fit process mainly occurs, because of which the strength of the center bridge 32 when the rotor 3 rotates can be increased. In the heretofore described example, a case in which the inner peripheral wall is of a straight line form is described as an example, but when the inner peripheral wall is of a curved form, it is not essential that the inner peripheral wall in the vicinity of the quadrature axis is further outward in the radial direction than the inner peripheral wall in the vicinity of the direct axis, as it is sufficient that there is a portion somewhere in the inner peripheral wall that is further inward in the radial direction than the inner peripheral wall in the vicinity of the quadrature axis.

As heretofore described, according to this embodiment, asynchronous reluctance motor that has superior rotor strength, can be manufactured at low cost, and is such that large torque is obtained, can be realized.

Figure 4:
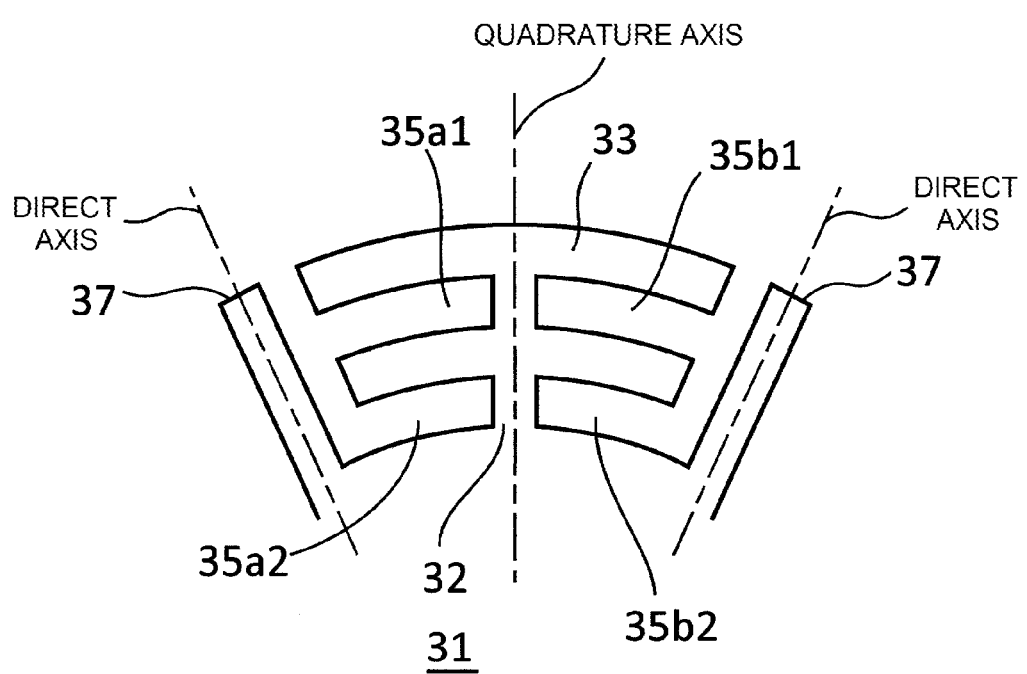
FIG. 4 is a front view showing a configuration of one pole of a rotor of a synchronous reluctance rotating electrical machine, which is another embodiment of the invention.
Figure 5:
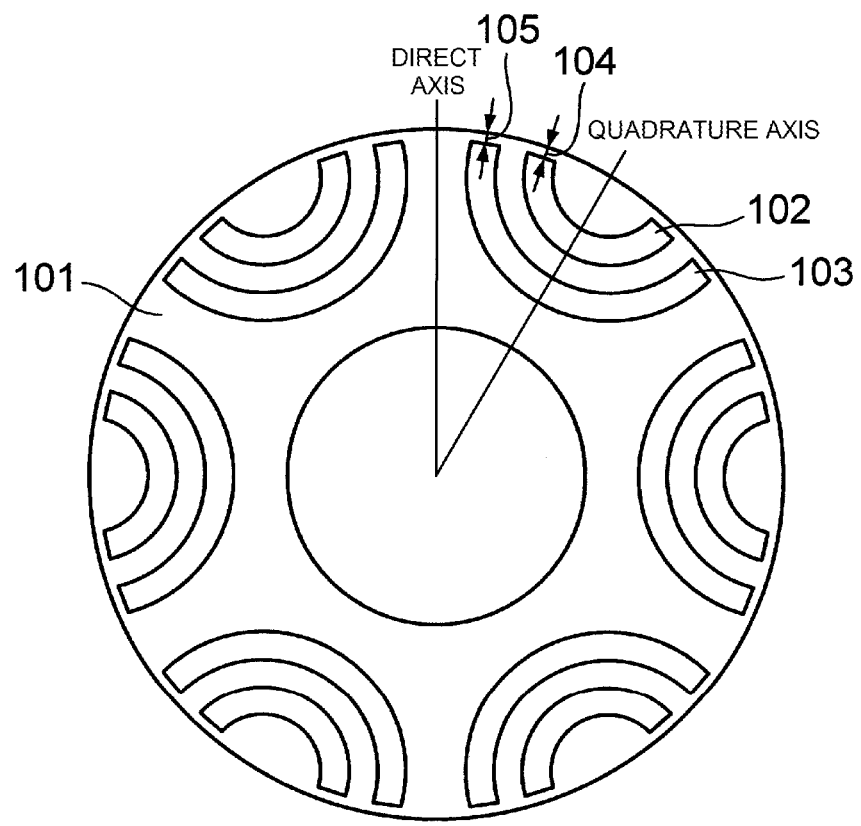
FIG. 5 is a diagram showing a configuration of a rotor of an existing synchronous reluctance motor.

Heretofore, a description has been given of one embodiment of the invention, but other embodiments of the invention are conceivable. For example, in the heretofore described embodiment, one quadrature axis is formed of two quadrature axis holes and the steel material enclosed by the holes and the outer periphery (that is, the center bridge 32 and the quadrature axis outer peripheral edge portion 33). However, the number of quadrature axis holes provided with respect to the center bridge in order to form one quadrature axis not being limited to two, it is sufficient that there is an even number thereof. For example, in order to form one quadrature axis, a multiple of pairs of quadrature axis holes may be formed in the rotor radial direction, sandwiching the center bridge 32 in the rotor rotation direction. FIG. 4 shows a configuration example of a rotor of this kind of synchronous reluctance rotating electrical machine. In this example, there are two quadrature axis holes 35a1 and 35a2 aligned in the rotor radial direction on the left side in the rotor rotation direction of the center bridge 32, and there are two quadrature axis holes 35b1 and 35b2 aligned in the rotor radial direction on the right side in the rotor rotation direction of the center bridge 32. Each of the quadrature axis holes 35a1, 35a2, 35b1, and 35b2 communicates with the outer periphery of the rotor on the side opposite to that of the center bridge 32. In this example, two pairs of holes sandwiching the center bridge 32 are formed in the rotor radial direction in order to form one pole, but three or more pairs of holes may be formed. Also, a straight line form has been given as an example of the form of the inner peripheral wall of the quadrature axis hole, but a curved form is also applicable to the motor, provided that the inscribed circle and the center bridge are distanced. Also, in the heretofore described embodiment, the distance between the outer peripheral surface of the rotor 3 and the inner peripheral surface of the fixed side iron core 2 disposed on the outer periphery of the rotor 3 may be greater the nearer to the quadrature axis in order to increase torque. Also, in the heretofore described embodiment, the invention is applied to a motor, but the invention is of course also applicable to a generator.

REFERENCE SIGNS LIST

3 . . . Rotor, 35a, 35b, 35a1, 35a2, 35b1, 35b2 . . . Quadrature axis hole, 4a . . . Central axis of rotation, 31 . . . Core portion, 32 . . . Center bridge, 33 . . . Quadrature axis outer peripheral edge portion, 37 . . . Direct axis projection

What is claimed is:

1. A synchronous reluctance rotating electrical machine comprising a rotor provided with a center bridge that is formed between quadrature axis holes formed in a circumferential direction, one pole being configured with an even number of the quadrature axis holes and the center bridge, wherein the quadrature axis holes communicate with an outer periphery of the rotor on a side opposite to a side of the center bridge, and the center bridge is located on an outer side, in a radial direction of the rotor, of an inscribed circle of the quadrature axis holes, wherein a region on a central axis of rotation side of inner peripheral walls of the quadrature axis holes inclines further in a direction away from a central axis of rotation as the region moves away from a direct axis toward a vicinity of a quadrature axis.

2. The synchronous reluctance rotating electrical machine according to claim 1, wherein the rotor has a direct axis projection protruding in a radial direction outer side between two neighboring center bridges.

3. The synchronous reluctance rotating electrical machine according to claim 2, wherein a distance from a central axis of the rotor to an outer peripheral surface on an extension of a radially directed straight line that passes through the center bridge is shorter than a distance from the central axis of the rotor to another place on the outer peripheral surface of the rotor.

4. The synchronous reluctance rotating electrical machine according to claim 1, wherein a distance from a central axis of the rotor to an outer peripheral surface on an extension of a radially directed straight line that passes through the center bridge is shorter than a distance from the central axis of the rotor to another place on the outer peripheral surface of the rotor.

5. A synchronous reluctance rotating electrical machine comprising a rotor provided with a center bridge that is formed between quadrature axis holes formed in a circumferential direction, one pole being configured with an even number of the quadrature axis holes and the center bridge, wherein
the quadrature axis holes communicate with an outer periphery of the rotor on a side opposite to a side of the center bridge, and
the center bridge is located on an outer side, in a radial direction of the rotor, of an inscribed circle of the quadrature axis holes, wherein
one portion or a whole of an outer peripheral surface of the rotor in a vicinity of the quadrature axis has a radius of curvature greater than a distance from a central axis of rotation of the rotor to an outermost peripheral portion of the rotor.

6. A synchronous reluctance rotating electrical machine comprising a rotor provided with a center bridge that is formed between quadrature axis holes formed in a circumferential direction, one pole being configured with an even number of the quadrature axis holes and the center bridge, wherein
the quadrature axis holes communicate with an outer periphery of the rotor on a side opposite to a side of the center bridge, and
the center bridge is located on an outer side, in a radial direction of the rotor, of an inscribed circle of the quadrature axis holes,
wherein
the rotor has a direct axis projection protruding in a radial direction outer side between two neighboring center bridges, and
one portion or a whole of an outer peripheral surface of the rotor in a vicinity of the quadrature axis has a radius of curvature greater than a distance from a central axis of rotation of the rotor to an outermost peripheral portion of the rotor.

7. A rotor, comprising:
a center bridge that is formed between quadrature axis holes formed in a circumferential direction, one pole being configured with an even number of the quadrature axis holes and the center bridge, wherein
the quadrature axis holes communicate with an outer periphery of the rotor on a side opposite to a side of the center bridge, and
the center bridge is located on an outer side, in a radial direction of the rotor, of an inscribed circle of the quadrature axis holes,
wherein a region on a central axis of rotation side of inner peripheral walls of the quadrature axis holes inclines further in a direction away from a central axis of rotation as the region moves away from a direct axis toward a vicinity of a quadrature axis.

* * * * *